Oct. 11, 1960     R. K. STRASEL ET AL     2,955,404
GRASS CATCHER FOR A LAWN MOWER
Filed May 9, 1958     2 Sheets-Sheet 1
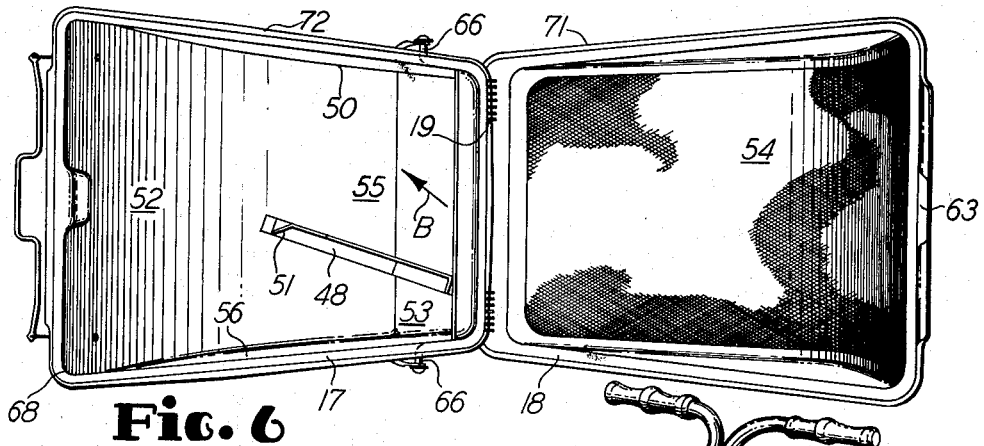
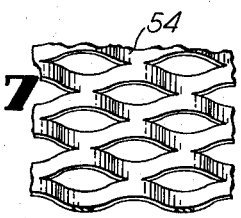
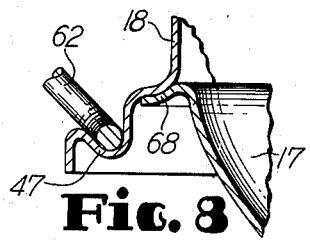
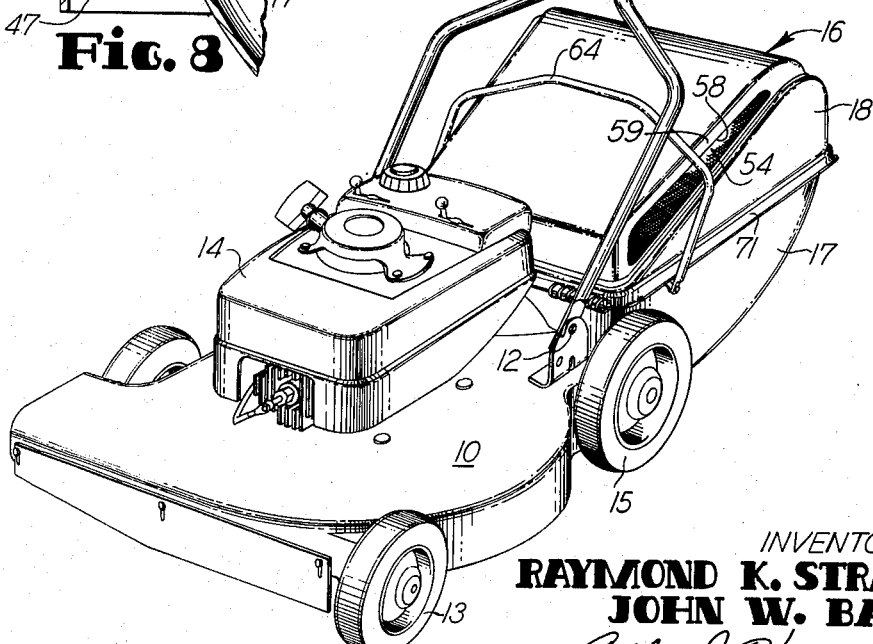
INVENTORS:
RAYMOND K. STRASEL
JOHN W. BARTH
BY: *Arthur J. Hansmann*
ATTORNEY

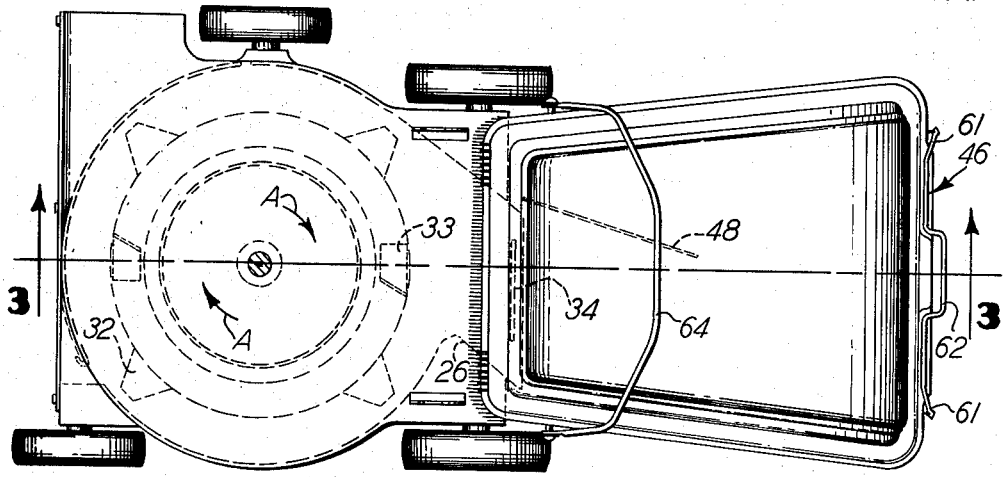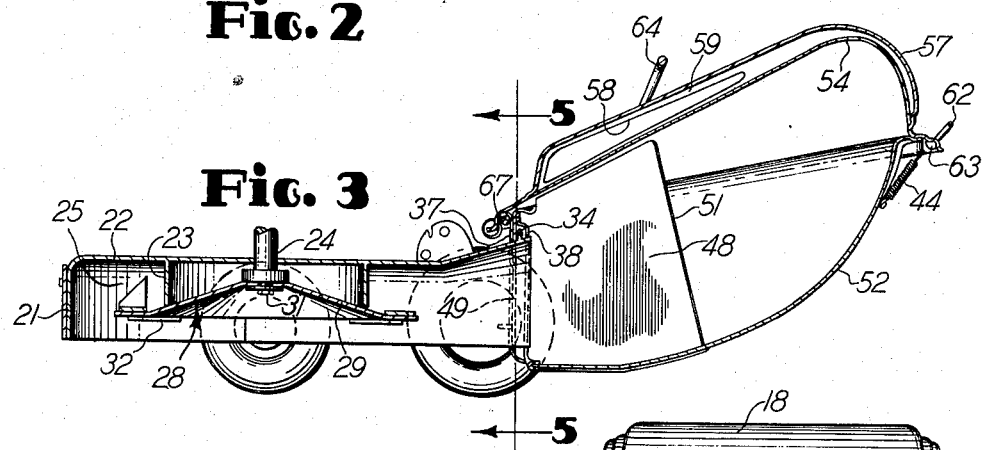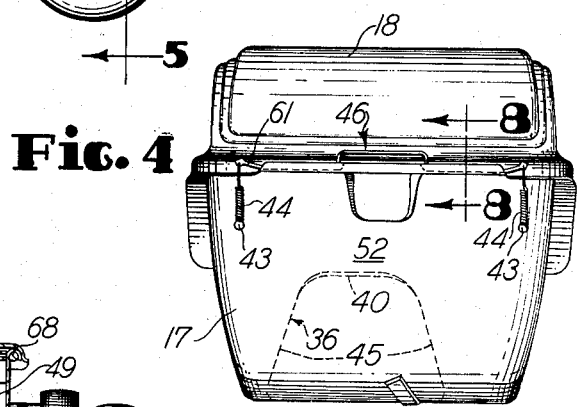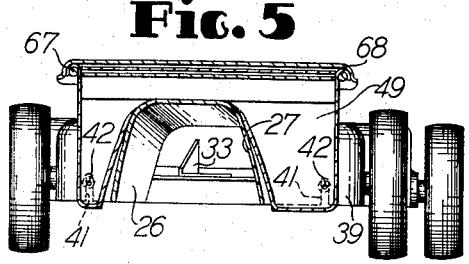
INVENTORS:
RAYMOND K. STRASEL
JOHN W. BARTH
ATTORNEY United States Patent Office 2,955,404
Patented Oct. 11, 1960

2,955,404
GRASS CATCHER FOR A LAWN MOWER

Raymond K. Strasel, Winthrop Harbor, Ill., and John W. Barth, Cudahy, Wis., assignors to Jacobsen Manufacturing Co., Racine, Wis., a corporation of Wisconsin Filed May 9, 1958, Ser. No. 734,351

4 Claims. (Cl. 56—202)

This invention relates to a lawn mower grass catcher, and it particularly relates to a grass catcher for use with a rotary type of lawn mower.

It is a general object of this invention to provide an improved grass catcher for attachment to a lawn mower, and particularly a rotary type of lawn mower wherein the grass clippings are blown out of the mower housing and into the catcher.

A specific object of this invention is to provide a grass catcher wherein the grass clippings are actually packed in the catcher so that the working capacity of the catcher will be large per unit of volume of the catcher. In accomplishing this particular object, this invention is designed to provide a rotary mower and grass catcher wherein the grass clippings are accumulated in a packed condition in one section of the catcher with the section being operatively farthest away from the inlet opening of the catcher so that the clippings are packed in said one section and continue to fill the catcher with a minimum of interference to the inlet opening of the catcher.

Another object of this invention is to provide a grass catcher which receives the discharge stream from a mower with the catcher arranged so that the discharge stream can be maintained at a high velocity through the initial passageway into the catcher and on through the path of the stream throughout, say, one-half of the catcher so that the clippings will not tend to clog the entrance to the catcher.

Still another object of this invention is to provide a grass catcher which can be easily emptied, and also which can be easily attached and detached with respect to a lawn mower. Also, with regard to attaching the catcher to the lawn mower, it is significant in that the catcher is attached behind the lawn mower and immediately under the lawn mower handle so that the catcher does not extend to the side of the lawn mower to be exposed for bumping objects or to block the view of the operator.

Still another object of this invention is to provide a grass catcher for use with a rotary type lawn mower with the catcher being inexpensive, light weight and sturdy.

Other objects and advantages will become apparent upon reading the following description in conjunction with the accompanying drawings, wherein:

Fig. 1 is a front perspective view of a preferred embodiment of a catcher of this invention and showing the catcher mounted on a rotary type of lawn mower.

Fig. 2 is an enlarged top plan view of the catcher and also of a part of the lawn mower.

Fig. 3 is a sectional view taken along the line 3—3 of Fig. 2.

Fig. 4 is a rear elevational view of the catcher shown in Fig. 1.

Fig. 5 is a sectional view taken on the line 5—5 of Fig. 3.

Fig. 6 is an enlarged bottom plan view of the catcher shown in Fig. 1, but showing the catcher removed from the mower and in the open position for emptying.

Fig. 7 is an enlarged plan view of a fragment of the screen shown in Fig. 6.

Fig. 8 is an enlarged sectional view taken along the line 8—8 of Fig. 4.

The same reference numerals refer to the same parts throughout the several views.

Fig. 1 shows a rotary lawn mower including a housing or a deck 10, of a generally cylindrical shape in plan view, and a handle 11 pivotally attached to the housing by mounting bolts, such as the shown bolt 12, and extending upwardly and rearwardly from the mower housing 10. Suitable ground wheels 13 and 15 are mounted on the mower housing, and the usual gasoline engine 14 is also shown mounted on the housing for driving the rotor disposed within the housing and hereinafter described. A grass catcher 16 is also shown mounted on the housing 10 at the rear thereof to be disposed within the lateral limits of the housing and beneath the handle 11. With this general arrangement of the mower housing 10 and the catcher 16, the latter is not projecting to either side of the housing to interfere with movement of the mower past buildings, trees, and like objects, and also the basket does not interfere with the operator's view of the grass to be mowed.

Of course, the catcher 16 is removably mounted on the rear end of the housing 10 so that when the catcher is filled with grass clippings, it can be readily and easily removed from the housing for emptying the clippings from the catcher. Fig. 3 shows the manner in which the catcher is mounted on the housing, and Fig. 6 shows the catcher open, as it is composed of a lower section 17 and an upper section 18 which are hinged together by means of ring members or hinges 19. The catcher has a hollow interior and is, therefore, termed shell-type. Figs. 2 and 3 show the housing 10, and it will here be noted that the housing is provided with an outer circular baffle or flange 21 which depends from the top surface 22 of the housing to terminate slightly spaced above the ground in the lower edge of the baffle 21, as shown in Fig. 3. An interior baffle or ring 23 also depends from the housing top 22, but the baffle 23 is shown to be shorter than the baffle 21. The usual engine shaft 24 projects through the housing top 22 such that the shaft 24 and the baffle 23 and the baffle 21 are all concentric. A chute or spout 26 is formed on the rear of the housing 10 to be tangential with the annulus-like space 25 defined by the baffles 21 and 23, and the chute thus projects rearwardly at an oblique angle to the forward direction of movement of the mower housing 10. The chute 26 is of an inverted U-shape as shown in Fig. 5, and it defines an outlet opening 27 in the housing 10.

Fig. 3 shows a mower rotor generally designated 28, and the rotor is shown to consist of a frusto-conical plate 29 which is attached to the engine shaft 24 by means of the bolt 31. It is important to note that the plate 29 extends beyond the circumferential limits of the inner baffle 23, and the outer circumference of the plate 29 has attached thereto a plurality of grass cutting blades 32 and a plurality of fan blades 33. The rotor plate is generally as shown and described in U.S. Patent No. 2,737,-772. The direction of rotation of the shaft 24 and the rotor 28 is as indicated by the arrows "A" in Fig. 2 such that the grass clippings, cut the blades 32, and the air, blown by the blades 33, are discharged in a stream from the housing 10 through the outlet 27 which is disposed at the tangential and, therefore, most efficient angle, as mentioned. Note that the chute is angled to the side of the catcher so that the stream will initially strike the catcher side.

Figs. 2 and 5 show the chute 26 extending rearwardly and angularly of the housing 10, and a lug or projection 34 is disposed on the top surface of the chute 26.

Fig. 4 shows that the front of the catcher lower section 17 has an inlet opening 36 which receives the rearward end of the chute 26, and two walls 37 and 38 on the catcher receive the lug 34. Fig. 5 shows the rear wall 39 of the housing 10 to be provided with two indentations or slots 41 at the lower edge thereof such that the slots 41 respectively register with alignment pins or bolts 42 on the front wall of the catcher 16, and thus the pins 42 are received in the slots 41, as shown in Fig. 5. The top 40 of the opening 36 aligns with the top of the chute 26 while the two sides 45 of the opening are spaced from the chute as shown. In this manner, the catcher 16 is mounted on the housing 10 with the front wall of the catcher abutting the rear wall 39 of the housing, and the catcher opening 36 and the chute lug 34, along with the alignment pins described, maintain the catcher on the housing until the rear end of the catcher is tilted upward to remove the alignment pins from the slots 41, and subsequently the catcher opening 36 can be removed from the lug 34. With this arrangement, the catcher is firmly mounted on the housing 10 such that only the tilting action will remove the catcher, and when a rise in the ground or a bump is encountered by the bottom of the catcher, the latter will not be jarred or pushed off the housing of the mower since only the described tilting action will remove the catcher from the housing.

At this time it should be noted that the catcher lower section 17 is formed of a solid imperforate material and is preferably made of a light weight and flexible plastic while the catcher upper section 18 is formed of the same plastic material but is perforate, and the two sections are hinged together as mentioned. Fig. 4 shows the lower section 17 provided with anchor pins 43 which have attached thereto tension coil springs 44. The springs 44 retain a rigid handle and latch 46 which can be readily positioned over the channel shaped lips 47 on the rear wall of the upper section 18. Figs. 4 and 8 show the handle 46 positioned to secure the two sections together. The two sections 17 and 18 form what can be termed a shell-type of catcher having, of course, a hollow interior for the storage and accumulation of grass clippings discharged from the mower housing into the catcher.

Figs. 3 and 6 particularly show the provision and location of a partition 48 which is attached to the bottom section 17 along the bottom wall thereof and the front wall 49. It is significant that the partition 48 is disposed at an angle with the angle being approximately that of the angle of the chute 26 with respect to the housing 10. More exactly, the angle of the partition is such that the discharge stream will not impinge directly on the partition, but rather it will strike the wall 50 at about the location of the lead line for numeral 50 in Fig. 6 as the stream is directed into the catcher along the line of the arrow designated "B." Also, the rear edge 51 of the partition 48 terminates spaced from the curved rear wall 52 of the catcher as the edge 51 terminates at the bottom of the curve. The arrangement is such that the air and clippings entering the catcher through the opening 38 continue into the catcher at substantially the angle of movement through the chute 26, and the clippings are directed upwardly by the wall 52 and are blown around the rear edge 51 of the partition, and they accumulate in a section designated 53 which is to the right of the partition 48 and to the front of the catcher 16. Of course, the air discharged into the catcher is released therefrom through the perforations in the upper section 18, and these perforations are provided by a screen 54 attached to the upper section as shown. It has been found that the catcher 16 thus operates to pack the grass clippings into the section 53 while the catcher left section, designated 55, remains clear of the clippings since the blast of air from the housing is strongest through this entrance section of the catcher. The catcher 16 can, therefore, accumulate a great quantity of clippings since the latter are actually packed within the catcher until both sections 53 and 55, and the entire catcher, is packed with clippings.

With this arrangement, the stream of air coming into the catcher is deflected off the wall 50 and then off the wall 52 so that the stream is directed upwardly and to the catcher opposite wall 56, and finally the grass clippings are deposited by gravity and the force of the air into the section designated 53. Since the air is blowing across the top at the section designated 53, the clippings will actually be packed into the catcher at this section which is operationally remote and farthest from the entrance into the catcher, and of course the air exhausts through the screen 54. Thus, it has been found that since the clippings actually pack into the catcher, scores of pounds of grass can be collected in the catcher at one time before the catcher need be emptied. With regard to the flow of air in the catcher, it should also be noticed that the upper section 18 has a curvature designated 57 in Fig. 3, and this curvature is a continuation of the curvature of the wall 52 so that no dead air pockets are formed in the catcher as the stream of air can be curved upwardly, as mentioned and desired. It should also be noticed in Fig. 3 that the screen 54 extends through the entire length of the upper section 18 so that the screen also has a curved rear end which approximates a parallel position to the curvature of the top 18, as shown.

The top 18 is provided with outlet openings 58 with one such opening on each side of the top 18, as shown between Figs. 1 and 3, and these openings provide for the escape of air passing through the screen 54. Further, it should be noticed that the top 18 has a depending flange 59 defining the top edges of the openings 58 so that air passing the screen 54 and approaching the openings 58 will be directed downwardly toward the ground by the flanges or edges 59, and thus any cross wind will not be as likely to blow the dust or engine exhaust upwardly to annoy the operator. Of course, it will be understood that a mower of the suction lift type described is inclined to pick up dust from the ground, and such dust would be discharged into the catcher and, therefore, it is significant that the dust be directed away from the operator, and such accomplishment is made possible by the arrangement described in connection with the openings 58 and the edges 59 of the catcher top 18.

Considering the discharge of air from the catcher, it is also significant to notice that, as shown in Fig. 7, the screen 54 is shown therein in bottom plan view, that being an enlargement of a fragment of the screen in Fig. 6. Thus, it will be seen that the screen is louvered toward one side so that the direction of the air discharged into the top 18 will be directed through the screen 54 to exhaust through the opening 58 to the left of the catcher with regard to facing toward the forward direction of the mower, and such opening is thus the one shown in Fig. 1. Since the air is discharged mainly through the opening 58 to the left, the catcher has a maximum efficiency discharge since it must be remembered that the initial storage of clippings is in the section 53 which is to the right of the catcher, and this section will, therefore, tend to obstruct the discharge of air on the right side of the catcher. The design and arrangement of the screen 54, as described, overcomes the possible restriction of discharge of air.

With reference to the latch 46, it will be noticed that the ends 61 of the latch are angled to be offset from the contiguous part of the latch, and thus the tension springs 44 will normally retain the latch 46 in the position shown so that the looped portion 62 of the latch will be spaced from the catcher, and thus, the hand of the operator can be readily inserted between the portion 62 and the catcher so that the back of the hand is against the inside surface of the portion 62. In this position of the hand, the fingers can abut the hand hold portion 63 of the upper section 18 so that a prying action of the back of the hand against the latch 62 will cause the latter to slip over the lip 47 and thereby release its latching relation with respect to the upper and lower catcher sections so that the sections can be swung to the emptying or open position, as shown in Fig. 6. It should thus be recognized that the operator's hand is fully supporting the upper section 18 when it is holding up under the hand hold portion 63 as described, and the hand is also in the convenient position for prying the latch 62 to the open position for emptying of the catcher.

While one hand of the operator is in the position just described, the other hand would normally be holding the handle or bail 64 of the catcher. It should thus be noticed that the bail 64 is pivotally attached to the catcher lower section at the oppositely disposed trunnions 66 which project on each side of the catcher section 17. Actually the trunnions 66 are ends of a bent rod 67 which extends across the front edge of the section 17 and, of course, the rod is suitably secured to the section 17 under the upper rim or edge 68. The bail 64 is designed and attached to the lower section to provide a handle for control of the catcher in removing the catcher from the mower and for carrying the catcher to a point of emptying the same. It should also be noticed that the bail 64 provides complete control of the lower section 17 while the bail intermediate portion extends spaced from the upper section, as shown in Fig. 3, so that the bail is able to be swung clear of the upper section 18 and over the lower section 17, as indicated in Fig. 6, so that the lower section can be swung to the emptying position which can be one hundred eighty degrees out of its position of normal use of Fig. 1. Another significant feature of the bail 64 is that it is attached to the trunnions 66 which are located forward of a line parallel to the axis through the trunnions or points 66 and extending through the center of gravity of the catcher 16 so that merely unlatching the latch 62 will cause the lower section 17 to swing downwardly under its own weight and the weight of the clippings therein so that the catcher will be virtually self-emptying upon release of the latch 62 and merely holding the bail 64.

Still another feature of the catcher is with relation to the edges of the upper and lower sections of the catcher, which edges form the seam or joint of the catcher. Thus, it will be noticed that the lower edge 71 of the upper section 18 and the upper edge or rim 68 of the lower section 17 nest together to form a joint therebetween. Fig. 6 shows that the flange 72 of the lower section rim 68 is actually slightly larger toward the rear of the catcher than the corresponding width of the edge 71 of the upper section 18. With this arrangement and because the sections can be made of a flexible plastic, when the two sections are swung to the assembled or joined position, the edge 72 flexes the edge 71 to cause the latter to bulge outwardly and thereby form a tight seam or joint between the edges 71 and 72, and thus avoid any escape or blow out of air from the catcher except that, of course, which goes through the screen 54.

While a specific embodiment of this invention has been shown and described, it should be obvious that certain changes could be made therein, and the scope of this invention should, therefore, be limited only by the appended claims.

What is claimed is:

1. A grass catcher comprising a downwardly open upper section and an upwardly open lower section hinged together along one side of said catcher and with the lower end of said upper section and the upper edge of said lower section being juxtaposed for forming a joint, said upper section being perforate for the passage of air therethrough, a hand grip portion on said upper section on the side thereof opposite said one side, said lower end overlapping said upper edge and having an upwardly directed recess therein, a latch including an offset portion, a tension spring connected between said lower section and said latch for releasably disposing the latter in said recess with said offset portion spaced from said catcher for reception of the hand of the user and said offset portion being disposed adjacent said hand grip portion, and a bail pivotally attached to said lower section on opposite sides thereof and toward said one side thereof with respect to the center of gravity of said catcher and extending across said upper section for both carrying and emptying said catcher.

2. A grass catcher comprising a downwardly open upper section and an upwardly open lower section hinged together along one side of said catcher and with the lower end of said upper section and the upper edge of said lower section being juxtaposed for forming a joint, said lower section including a bottom disposed thereon opposite said upper edge, a hand grip portion on said upper section on the side thereof opposite said one side, a resiliently biased latch interengaged between said sections on the other side thereof for releasably securing said sections together, and a bail including two ends pivotally attached to said lower section at two points on opposite sides thereof and toward said one side thereof with respect to a line through the center of gravity of said catcher and parallel to said two points, said bail extending across said upper section and being spaced therefrom a distance sufficient and being sufficiently long for swinging thereacross and over at least a portion of said bottom of said lower section when said sections are hingedly swung away from each other for emptying said catcher.

3. A grass catcher comprising a downwardly open upper section and an upwardly open lower section hinged together along one side of said catcher and with the lower end of said upper section and the upper end of said lower section being juxtaposed for forming a joint, said upper section being perforate for the passage of air therethrough, a hand grip portion on said upper section on the side thereof opposite said one side, a resiliently biased latch attached to said catcher for releasably securing said sections together and including two ends interengaged with one of said sections and including a portion intermediate said two ends and spaced from said catcher adjacent said hand grip for receiving the hand of the operator for prying said latch to a released position, and a bail pivotally attached to said lower section on opposite sides thereof and with the axis of pivot being toward said one side thereof with respect to a line through the center of gravity of said catcher and parallel to said axis and with said bail being sufficiently long and extending across said upper section spaced therefrom a distance sufficient for hingedly swinging said sections away from each other for emptying said catcher.

4. A grass catcher comprising a downwardly open upper section and an upwardly open lower section hinged together along one side of said catcher and with the lower end of said upper section and the upper end of said lower section being juxtaposed for forming a joint extending around said catcher, said catcher having an inlet opening therein and including a bottom on said lower section opposite said upper end, said upper section being perforate for the passage of air therethrough, a hand grip portion on said upper section on the side thereof opposite said one side, a latch attached to said catcher for releasably securing said sections together and including a portion spaced from said catcher adjacent said hand grip portion for receiving the hand of the operator for prying said latch to a released position, a bail pivotally attached to said lower section on opposite sides thereof and toward said one side thereof with respect to the center of gravity of said catcher and including an intermediate portion extending across said upper section and being spaced therefrom a distance sufficient to pivot clear of said upper section and across said bottom when said lower section is hingedly swung on said upper section for emptying said catcher, and a partition attached inside said catcher and extending in the interior thereof adjacent said opening and only in an upright plane with respect to the plane of said joint.

References Cited in the file of this patent

UNITED STATES PATENTS

| | | |
|---|---|---|
| 2,071,872 | Cockburn | Feb. 23, 1937 |
| 2,361,637 | Lathrop | Oct. 31, 1944 |
| 2,641,100 | Sylvester | June 9, 1953 |
| 2,734,327 | Whitney | Feb. 14, 1956 |
| 2,747,356 | Peterson | May 29, 1956 |
| 2,762,184 | Farrer | Sept. 11, 1956 |
| 2,783,604 | Cahill, Jr. | Mar. 5, 1957 |
| 2,851,844 | Bailey | Sept. 16, 1958 |